（12） United States Patent
Yoo et al.

(10) Patent No.: US 12,007,840 B2
(45) Date of Patent: Jun. 11, 2024

(54) STORAGE CONTROLLER, OPERATION METHOD THEREOF

(71) Applicant: Samsung Electronics Co., Ltd., Suwon-si (KR)

(72) Inventors: Kwang Ho Yoo, Incheon (KR); Seung Min Ha, Suwon-si (KR); Kil Hwan Kim, Seoul (KR); Ho Young Chang, Seoul (KR); Ju Hyung Hong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 108 days.

(21) Appl. No.: 17/517,946

(22) Filed: Nov. 3, 2021

(65) Prior Publication Data

US 2022/0269561 A1 Aug. 25, 2022

(30) Foreign Application Priority Data

Feb. 24, 2021 (KR) .................. 10-2021-0024815

(51) Int. Cl.
*G06F 11/00* (2006.01)
*G06F 3/06* (2006.01)
*G06F 11/10* (2006.01)

(52) U.S. Cl.
CPC ........ *G06F 11/1076* (2013.01); *G06F 3/0604* (2013.01); *G06F 3/0655* (2013.01); *G06F 3/0689* (2013.01)

(58) Field of Classification Search
CPC .. G06F 11/1076; G06F 3/0604; G06F 3/0655; G06F 3/0689
See application file for complete search history.

(56) References Cited

U.S. PATENT DOCUMENTS

| 6,711,703 | B2 | 3/2004 | MacLaren et al. |
| 7,679,133 | B2 | 3/2010 | Son et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 8,700,951 | B1 * | 4/2014 | Call ................... G06F 11/0727 714/6.24 |
| 9,530,491 | B1 | 12/2016 | Uttarwar et al. |
| 9,881,696 | B2 | 1/2018 | Lee |
| 10,467,094 | B2 | 11/2019 | Kim et al. |
| 10,521,303 | B2 | 12/2019 | Kim et al. |
| 2011/0233648 | A1 | 9/2011 | Seol et al. |

(Continued)

FOREIGN PATENT DOCUMENTS

KR 10-0257422 B1 5/2000
KR 10-2018-0045220 A 5/2018

*Primary Examiner* — Philip Guyton
(74) *Attorney, Agent, or Firm* — Harness, Dickey & Pierce, P.L.C.

(57) ABSTRACT

A storage controller and an operating method of the storage controller are provided. The storage controller includes processing circuitry configured to read sub-stripe data from each of a plurality of non-volatile memory devices connected with a RAID (Redundant Array of Inexpensive Disk), check error information of at least one of the sub-stripe data, and perform a RAID recovery operation in response to the at least one of the sub-stripe data having an uncorrectable error, and a RAID memory which stores calculation results of the RAID recovery operation.

16 Claims, 7 Drawing Sheets

(56) References Cited

U.S. PATENT DOCUMENTS

2013/0227346 A1\* 8/2013 Lee ................... G06F 11/108
  714/6.24
2017/0220410 A1\* 8/2017 Kim ................ G06F 11/1072
2020/0019463 A1 1/2020 Werner et al.

\* cited by examiner

STORAGE CONTROLLER, OPERATION METHOD THEREOF

CROSS-REFERENCE TO RELATED APPLICATION

This application claims priority from Korean Patent Application No. 10-2021-0024815 filed on Feb. 24, 2021 in the Korean Intellectual Property Office, and all the benefits accruing therefrom under 35 U.S.C. 119, the contents of which in its entirety are herein incorporated by reference.

BACKGROUND

1. Field of the Invention

The present inventive concepts relate to a system including a storage device and a RAID.

2. Description of the Related Art

A RAID (Redundant Array of Inexpensive Disk) is a method that is mainly used for storage media such as a server that has important data, and may use various configurations, such as a type of simply distributing data into a plurality of storage media and performing input/output at once or duplicating and storing the same data in the plurality of storage media, or a type of storing a parity in one or more storage media of the plurality of storage media and being able to restore data with an error to normal data, even if an error occurs in data stored in another storage medium. When such a RAID is used, data loss is reduced or prevented and stability of data is enhanced. Further, a balance of I/O operations may be achieved and the overall performance of the server may be improved.

On the other hand, in a system for ensuring the data integrity, among the configurations of RAID, a system of RAID level 5 or RAID level 6 in which the parity bits are distributed and stored is used. The RAID level 5 is a type in which one parity bit is distributed and stored for each data chunk and the RAID level 6 is a type in which two parity bits are distributed and stored for each data chunk. When using the RAID system of level 5 or level 6, by including one or two spare storage regions, the RAID recovery is performed on the spare storage region when a failure occurs.

Since such a RAID recovery process is a work which accesses the parity bits and the data included in the overall RAID system to generate lost data, there are disadvantages which increase the time required for RAID recovery process, and have a significant impact on the I/O performance of the overall RAID system due to the usage of system resources in the rebuilding process.

SUMMARY

Some example embodiments of the present inventive concepts provide a storage controller that may reduce an amount of time for performing the recovery operation by using less resources, when an uncorrectable error occurs in a RAID system and a recovery is performed, and an operation method of the same.

Some example embodiments of the present inventive concepts also provide a storage device that may reduce an amount of time for performing the recovery operation by using less resources, when an uncorrectable error occurs in a RAID system and a recovery is performed.

Some example embodiments of the present inventive concepts also provide a RAID storage controller that may reduce an amount of time for performing the recovery operation by using less resources, when an uncorrectable error occurs and a recovery is performed.

According to some example embodiments of the present inventive concepts there is provided a storage device that may reduce the time required for the recovery operation by using less resources, when an uncorrectable error occurs and a recovery is performed.

According to some example embodiments of the present inventive concepts there is provided a storage controller including processing circuitry configured to read sub-stripe data from each of a plurality of non-volatile memory devices connected with a RAID (Redundant Array of Inexpensive Disk), check error information of at least one of the sub-stripe data, and perform a RAID recovery operation in response to the at least one of the sub-stripe data having an uncorrectable error, and a RAID memory configured to store calculation results of the RAID recovery operation.

According to some example embodiments of the present inventive concepts an operation method of a storage controller may include, reading sub-stripe data from each of a plurality of non-volatile memory devices connected with a RAID (Redundant Array of Inexpensive Disk), checking error information of the read sub-stripe data to check an existence of an uncorrectable error, increasing a failure count value and reading next sub-stripe data, in response to the read sub-stripe data having an error, and performing an XOR calculation by the read sub-stripe data in response to the read sub-stripe data having no error, wherein the error information is stored as a header or basic information of the sub-stripe data.

According to some example embodiments of the present inventive concepts there is provided a storage controller including a DMA (Direct Memory Access) interface connected to a plurality of non-volatile memory devices, the DMA interface configured to transmit and receive sub-stripe data to and from each of the non-volatile memory devices, and processing circuitry configured to check error information of the sub-stripe data, and perform an XOR calculation on the basis of the sub-stripe data having no uncorrectable error to extract recovery data, wherein the processing circuitry is configured not to extract the recovery data in response to the number of sub-stripe data having the uncorrectable error exceeding the number of parity sub-stripes.

However, example embodiments of the present inventive concepts are not restricted to the ones set forth herein. The above and other example embodiments of the present inventive concepts will become more apparent to one of ordinary skill in the art to which the present inventive concepts pertain by referencing the detailed description of the present inventive concepts given below.

DETAILED DESCRIPTION

Hereinafter, some example embodiments according to the present inventive concepts will be described referring to the accompanying drawings.

Figure 1:
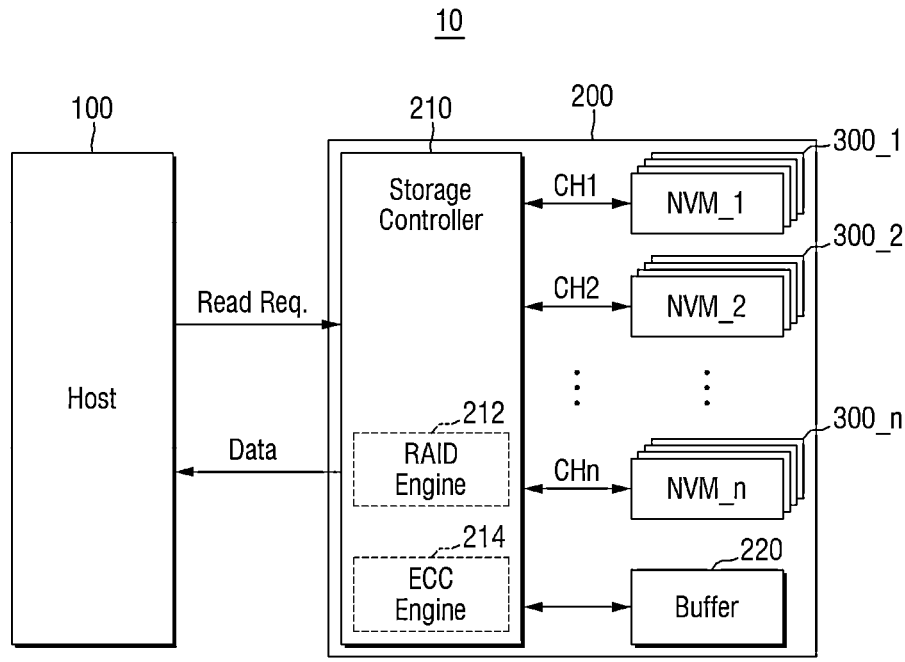
FIG. 1 is a block diagram showing a RAID system according to some example embodiments.

FIG. 1 is a block diagram showing a RAID system according to some example embodiments.

Referring to FIG. 1, a RAID system 10 includes a host 100 and a storage device 200.

The host 100 sends a read request (Read Req.) to the storage device 200 to read the data. The storage device 200 reads and sends data Data requested to read from a plurality of non-volatile memory devices 300_1 to 300_n. However, the reads of the plurality of non-volatile memory devices 300_1 to 300_n of the storage device 200 are not limited thereto.

Further, the storage device 200 may perform garbage collection, metadata read, and/or the like as a read operation that may be performed internally. The present inventive concepts may also be applied to the internal read operation to the non-volatile memory device s300_1 to 300_n of the storage device 200 without external commands or control.

The host 100 writes data to the storage device 200 and/or reads data stored in the storage device 200. The host 100 may provide commands, addresses, and/or data to the storage device 200. The host 100 may request to read data from the storage device 200, using commands and/or addresses. As an example, the host 100 may include at least one processor. The host 100 may be a processor itself and/or an electronic device and/or system that includes the processor.

The storage device 200 may access the non-volatile memory devices 300_1 to 300_n in response to the command CMD provided from the host 100, and/or may perform various operations requested by the host 100. The storage device 200 may read the data stored in the buffer 220 and/or the non-volatile memory devices 300_1 to 300_n, in particular, depending on the command or address provided by the host 100. Further, the storage device 200 transmits the read data Data to the host 100. The storage device 200 may include the storage controller 210, and/or the plurality of non-volatile memory devices 300_1 to 300_n.

The storage controller 210 provides interfacing between the host 100 and the storage device 200. The storage controller 210 may also be referred to as a RAID controller according to the example embodiments.

The storage controller 210 reads the data to determine whether an error is correctable, and if there is an uncorrectable error UCE, the storage controller 210 recovers the data in which the error has occurred.

The data read according to some example embodiments includes a header. As an example, the header may include information about read success and/or read failure of the data. As another example, the header may include information on error correction success (ECC Success) and/or error correction failure (ECC Fail) of the data. As still another example, the header may include information about the presence and/or absence of uncorrectable errors.

According to some example embodiments, the storage controller 210 may store basic information. The basic information may include, for example, read success and/or read failure information of the data. The basic information may include, as another example, information on error correction success (ECC Success) and/or error correction failure (ECC Fail) of the data. As still another example, the basic information may include information about the presence and/or absence of uncorrectable errors.

According to some example embodiments, the storage controller 210 may recover the data (A1 data), according to data (e.g., A2, A3 to An–1, Pa) read from the remaining non-volatile memory devices belonging to the same stripe, when uncorrectable errors based on the header are included in the data (e.g., A1 data) read from any one of the plurality of non-volatile memory devices.

For example, when an uncorrectable error (Uncor or UCE) occurs in the first data, the storage device 200 reads remaining second data belonging to the same stripe except for the first data in which an error occurs, and performs a predetermined (or alternately given) recovery calculation according to the remaining second data read to recover the first data. For example, the storage controller 210 may store data in the plurality of non-volatile memory devices 300_1 to 300_n in a RAID manner. Specifically, the user data and the parity data may be stored in each of the plurality of non-volatile memory devices in units of sub-stripe. For example, if the user data are N sub-stripe data and the parity data are M sub-stripe data (N and M are natural numbers, and N is greater than M), the number of the non-volatile memory devices connected in the RAID manner may be (N+M).

To use the recovery type described above, the storage controller 210 may include a RAID engine 212 and/or an ECC engine 214. When the storage controller 210 receives the data read from the non-volatile memory device 300 through the flash interface 217, the storage controller 210 may perform a flash recovery on the data that is read through the ECC engine 214.

The flash recovery may be techniques such as various read environment adjustments, a valley search, and/or an ECC (Error Correction Code) on the chunk generated in one of the non-volatile memory devices 300.

The flash recovery may include, for example, hard decision decoding and/or soft decision decoding. The hard decision decoding and/or the soft decision decoding are used. Although the hard decision decoding uses less resources and is therefore efficient, error correction capability may relatively deteriorate. On the other hand, the soft decision decoding has higher error correction capability than the hard decision decoding, but uses a lot of resources. Therefore, according to some example embodiments, the ECC engine 214 may primarily perform the hard decision decoding and generate the decoding result as a header and/or basic information of the data. The ECC engine 214 may secondarily perform the soft decision decoding under the control of the RAID engine 212.

The RAID engine 212 processes the data requested to be accessed in units of stripes for storing the data in the plurality of non-volatile memory devices 300_1 to 300_n in a RAID manner. For example, if an uncorrectable error UCE occurs in one or more sub-stripes among the sub-stripes included in a single stripe, the storage controller 210 performs RAID recovery RR and may recover the single stripe.

According to some example embodiments, the RAID engine 212 may check the header and/or basic information generated by the ECC engine 214 and perform the RAID recovery. At this time, the header may indicate information about whether an uncorrectable error UCE is included.

According to some example embodiments, even if the header indicates the uncorrectable error UCE, in the case of an error having a probability close to a correctable error as an uncorrectable error due to deterioration of the memory cell, the ECC engine 214 may be controlled to perform re-error decoding. For example, although the ECC engine 214 primarily performs the hard decision decoding on the read data and determines an uncorrectable error UCE, when the soft decision decoding is secondarily performed and the determination may change to a correctable error CE, the RAID engine 212 controls the ECC engine 214 to update the decoding settings, and the ECC engine 214 may perform the re-error decoding with updated decoding settings, for example, in the soft decision decoding manner.

As in the aforementioned example embodiments, because it is possible to check whether an uncorrectable error is included according to the header and/or basic information, the RAID engine 212 of the storage controller 210 may make a determination by itself without the intervention of the CPU 211 to perform the RAID recovery.

Figure 2:
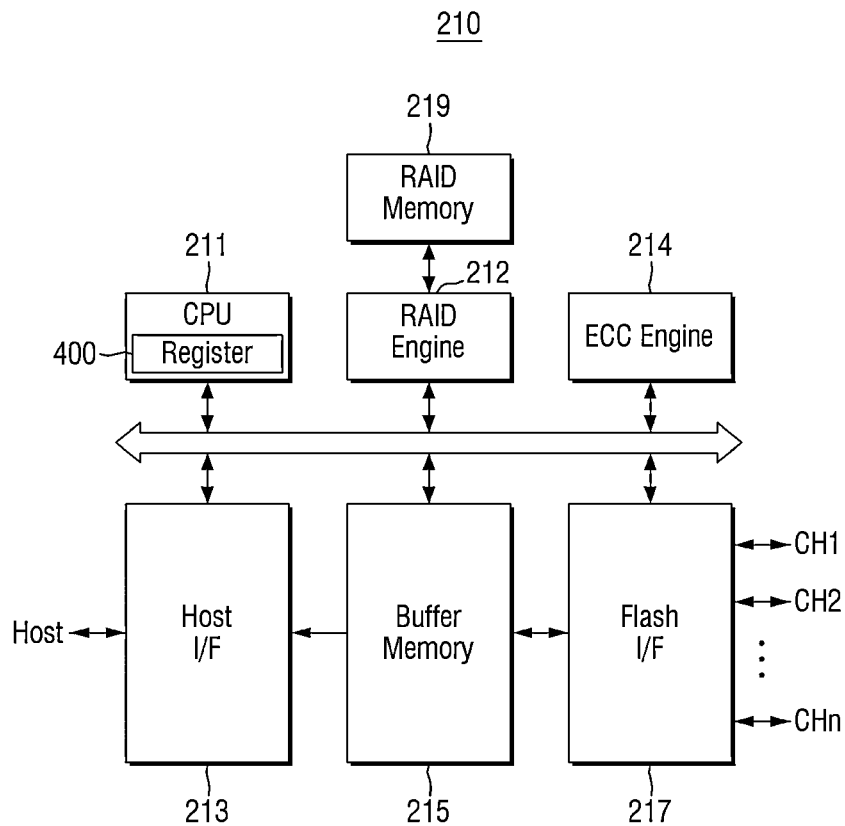
FIG. 2 is a block diagram showing the configuration of the storage controller shown in FIG. 1 as an example.

FIG. 2 is a block diagram showing the configuration of the storage controller 210 shown in FIG. 1 as an example.

Referring to FIG. 2, the storage controller 210 according to some example embodiments includes a CPU 211, a RAID engine 212, a host interface 213, an ECC engine 214, a buffer memory 215, and/or a flash interface 217.

The CPU (Central Processing Unit) 211 sends various types of control information for read/write operation of the non-volatile memory device (300_1 to 300_n, see FIG. 1) to the registers of the host interface 213 and the flash interface 217. The CPU 211 may operate according to the firmware provided for various control operations of the storage controller 210. For example, the CPU 211 may execute a garbage collection for managing the non-volatile memory devices 300_1 to 300_n and/or a flash Transfer Layer (FTL) for performing address mapping, wear leveling, and/or the like.

According to some example embodiments, the CPU 211 may include a register 400. The register 400 may store calculation data that require rapid access to generate a control signal of the CPU 211. According to some example embodiments, the register 400 may store basic information. The basic information may include, for example, presence and/or absence of error detection of data read from the non-volatile memory device 300 and/or data requested to be written on the non-volatile memory device 300, the number of error bits, the position of the error bits, presence or absence of error correction, presence or absence of error correction impossibility and/or the like. The CPU 211 may check the basic information to control the operation execution of the RAID engine 212. The register 400 may be implemented as, for example, TCM (Tightly Coupled Memory) and/or may be implemented as SRAM (Static RAM) and/or the like.

Although the register 400 has been described as being included in the CPU 211 in the above-described example embodiments, it may be implemented separately from the CPU 211 according to other example embodiments.

According to some example embodiments, the RAID engine 212 divides the data provided by the host 100 in units of stripe, and distributes and/or stores each stripe into each of the non-volatile memory devices 300_1 to 300_n in units of sub-stripe. The RAID engine 212 may generate parity to generate data in units of stripe. The number and/or configuration type of sub-stripes corresponding to parity according to various example embodiments may be configured differently depending on the RAID type. Each sub-stripe may include at least one sub-stripe capable of performing the ECC decoding.

The RAID may be various levels. According to some example embodiments, the RAID may be RAID levels (e.g., RAID 0+1, RAID 1+0, RAID 5+0, RAID 5+1 or RAID 0+1+5) in which any one of RAID level 0 (Striped set without parity or Striping), RAID level 1 (Mirrored set without parity or Mirroring), RAID level 2 (Hamming code parity), RAID level 3 (Striped set with dedicated parity, bit interleaved parity, or byte level parity), RAID level 4 (Block level parity), RAID level 5 (Striped set with distributed parity or interleave parity), RAID level 6 (Striped set with dual distributed parity), RAID level 7, RAID level 10, and RAID level 53, and/or at least two of the RAID levels are merged.

According to some example embodiments, the storage controller 210 may further include a RAID memory 219. The RAID memory 219 may be used as a working memory of the RAID engine 212 and may be implemented as various memories. For example, the RAID memory 219 may store an intermediate value of the recovery calculation performed by the RAID engine 212 and/or the result value of the recovery calculation. That is, the RAID memory 219 may store the XOR calculation result between the sub-stripe data. According to some example embodiments, the RAID memory 219 may be a volatile memory and/or a non-volatile memory. For example, the RAID memory 219 may be implemented as at least one of Cache, a DRAM (Dynamic RAM), a SRAM (Static RAM), a PRAM (Phase-change RAM), a MRAM (Magnetic RAM), a RRAM (Resistive RAM), and/or flash memory devices.

The host interface 213 may communicate with the host 100. For example, the host interface 213 provides a communication channel with the host 100. The host interface 213 provides a physical connection between the host 100 and the storage device 200. That is, the host interface 213 provides interfacing with the storage device 200 to correspond to a bus format of the host 100. The bus format of the host 100 may be configured as at least one of a USB (Universal Serial Bus), a SCSI (Small Computer System Interface), a PCI express, an ATA, a PATA (Parallel ATA), a SATA (Serial ATA), a SAS (Serial Attached SCSI), and/or a UFS (Universal Flash Storage).

According to some example embodiments, the ECC engine 214 may perform encoding for error detection and correction on the data requested to be written. According to some example embodiments, the ECC engine 214 detects an error included in the data read from the non-volatile memory device 300 and/or corrects the detected error.

The ECC engine 214 has a limit on the number of correctable bits. When an error of the number of bits exceeding the limits is detected, the ECC engine 214 may determine the uncorrectable error UCE, and may notify the CPU 211 of an occurrence of uncorrectable error UCE. In some example embodiments, the ECC engine 214 may record whether the error is a correctable error CE or an uncorrectable UCE, as the header information H of the data and/or basic information of the register 400. In some example embodiments, the ECC engine 214 may also record the number of bits in which an error has occurred, as the header information H of the data and/or as basic information of the register 400. The recorded header and/or basic information may be 1 bit or may be a plurality of bits, according to some example embodiments.

Predetermined (or alternately given) information, programs and/or commands regarding the operation or state of the storage controller 210 may be stored in the buffer memory 215. As an example, the buffer memory 215 may temporarily store write data, read data and/or global metadata. The global metadata may be, for example, various environmental information on the entire storage device.

According to some example embodiments, the buffer memory 215 may include a cache, a ROM (Read Only Memory), a PROM (Programmable Read Only Memory), an EPROM (Erasable PROM), an EEPROM (Electrically Erasable Programmable Read-Only Memory), a PRAM (Phase-change RAM), a flash memory, a SRAM (Static RAM) and/or a DRAM (Dynamic RAM). Although the buffer memory 215 may be implemented by being included in the storage controller 210 in some example embodiments, the buffer memory 215 may also be implemented as a non-volatile memory outside the storage controller 210 as in FIG. 1 in another example embodiment.

The flash interface 217 exchanges data with the non-volatile memory devices 300_1 to 300_n. According to some example embodiments, the flash interface 217 writes the data sent from the buffer memory 215 on the non-volatile memory devices 300_1 to 300_n via respective memory channels CH1, CH2, . . . , and CHn. According to some example embodiments, the flash interface 217 gathers the read data from the non-volatile memory devices 300_1 to 300_n provided through the memory channel. The gathered data is stored in the buffer memory 215 later and may be processed by the CPU 211. As an example, each of the data to be written and the data before being gathered may further include a header, and the RAID engine 212 may check whether each data includes an error or is an uncorrectable error or a correctable error from the header. Alternatively, as another example, each or one or more of the data to be written and the data before being gathered may be associated with the basic information including the error information, and the RAID engine 212 may check whether each or one or more data includes an error or is an uncorrectable error or a correctable error or the number of error bits, from the basic information.

According to some example embodiments, the flash interface 217 may include a DMA (Direct Memory Access) interface. Each of the non-volatile memory devices 300_1 to 300_n may be connected to the storage controller 210 through the DMA interface without going through the host 100. Specific matters thereof will be described below in FIG. 7.

In addition, if an uncorrectable error UCE is detected in the data read from the non-volatile memory devices 300_1 to 300_n, the storage controller 210 may perform a recovery operation. By applying this recovery type, the storage controller 210 of the present inventive concepts may recover data at high speed when an uncorrectable error UCE occurs.

The RAID engine 212 and the ECC engine 214 may execute the corresponding recovery algorithm for the recovery operation according to some of the above-described example embodiments. The algorithm for recovery may be stored in a ROM (not shown) and/or the non-volatile memory devices 300_1 to 300_n provided in the storage device 200. Further, the algorithm is loaded into the buffer memory 215 at the time of startup and may be executed by the RAID engine 212 and/or the ECC engine 214.

Figure 3:
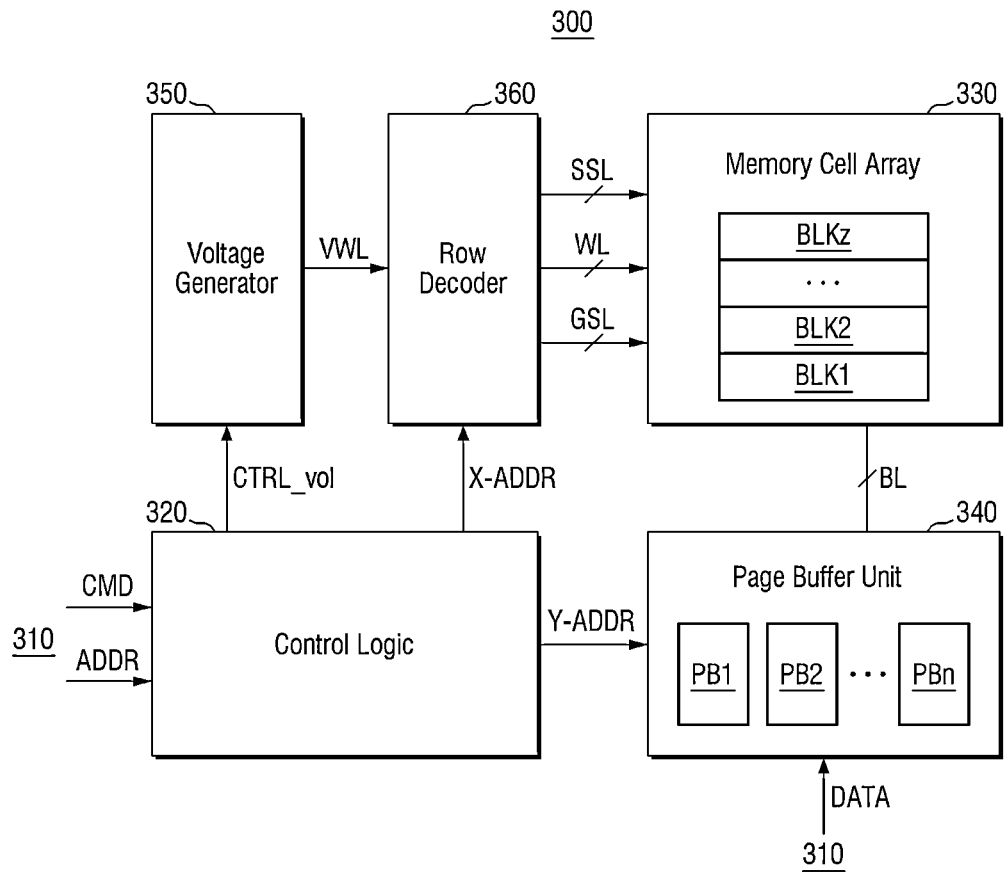
FIG. 3 is an example block diagram showing a non-volatile memory device according to some example embodiments.

FIG. 3 is an example block diagram showing a non-volatile memory device according to some example embodiments.

Referring to FIG. 3, the non-volatile memory device 300 includes a control logic circuit 320, a memory cell array 330, a page buffer unit 340, a voltage generator 350, and/or a row decoder 360. Although it is not shown in FIG. 3, the non-volatile memory device 300 may further include a memory interface circuit 310, and may further include a column logic, a pre-decoder, a temperature sensor, a command decoder, an address decoder, and/or the like.

The control logic circuit 320 may generally control various operations inside the non-volatile memory device 300. The control logic circuit 320 may output various control signals in response to a command CMD and/or an address ADDR from the memory interface circuit 310. For example, the control logic circuit 320 may output a voltage control signal CTRL_vol, a row address X-ADDR, and/or a column address Y-ADDR.

The memory cell array 330 may include a plurality of memory blocks BLK1 to BLKz (z is a positive integer), and each of the plurality of memory blocks BLK1 to BLKz may include a plurality of memory cells. The memory cell array 330 may be connected to the page buffer unit 340 through the bit line BL, and may be connected to the row decoder 360 through word lines WL, string selection lines SSL, and/or ground selection lines GSL.

In some example embodiments, the memory cell array 330 may include a three-dimensional memory cell array, and the three-dimensional memory cell array may include a plurality of NAND strings. Each NAND string may include memory cells connected to word lines vertically stacked on the substrate. U.S. Pat. Nos. 7,679,133, 8,553,466, 8,654,587, 8,559,235, and U.S. Patent Application Publication No. 2011/0233648 are incorporated herein by reference. In some example embodiments, the memory cell array 330 may include a two-dimensional memory cell array, and the two-dimensional memory cell array may include a plurality of NAND strings placed along row and column directions.

The page buffer unit 340 may include a plurality of page buffers PB1 to PBn (n is an integer of three or more), and the plurality of page buffers PB1 to PBn may be connected to the memory cells through a plurality of bit lines BL. The page buffer unit 340 may select at least one bit line among the bit lines BL in response to the column address Y-ADDR. The page buffer unit 340 may operate as a write driver and/or a detection amplifier, depending on the operating mode. For example, at the time of the write operation, the page buffer unit 340 may apply a bit line voltage corresponding to the data to be programmed to the selected bit line. At the time of the read operation, the page buffer unit 340 may detect the current and/or voltage of the selected bit line and detect the data stored in the memory cell.

The voltage generator 350 may generate various types of voltages for performing write, read, and/or erasure operations according to the voltage control signal CTRL_vol. For example, the voltage generator 350 may generate a write (or program) voltage, a read voltage, a program verification voltage, an erase voltage, and/or the like, as a word line voltage VWL.

The row decoder 360 may select one of a plurality of word lines WL in response to the row address X-ADDR, and/or select one of a plurality of string selection lines SSL. For example, the row decoder 360 may apply the program voltage and/or the program verification voltage to the selected word line at the time of the write operation, and may apply the read voltage to the selected word line at the time of the read operation.

Figure 4:
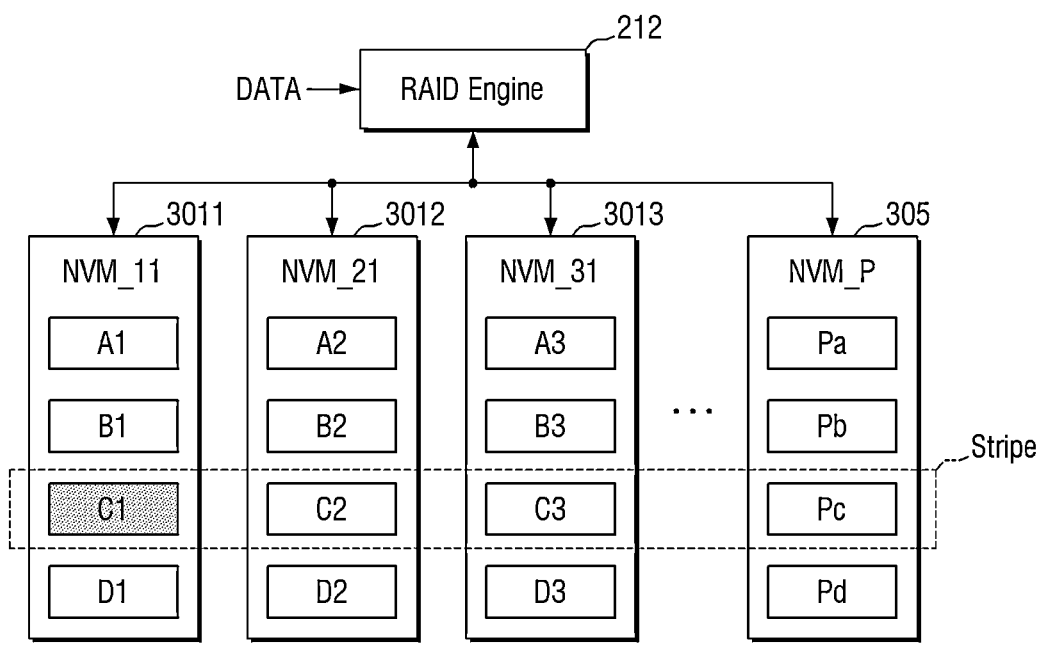
FIG. 4 is a diagram for explaining a recovery operation of a RAID controller according to some example embodiments.

FIG. 4 is a diagram for explaining a recovery operation of a RAID controller according to some example embodiments.

Referring to FIG. 4, the RAID engine 212 divides the data requested to be written DATA from the host 100 into a plurality of sub-stripe data. The RAID engine 212 may distribute and store the divided sub-stripe data (e.g., A1, A2, A3 to An−1) into various storages (e.g., 3011, 3012, 3013, and/or 305). One or more parity sub-stripe Pa may be included in the divided sub-stripe data. Here, the storage may correspond to a chip, a die, and/or the like. Since the probability that an error occurs in a plurality of storages at the same time is almost low, the reliability of data may be improved by the RAID engine 212.

The data DATA may be transmitted in units of stripe between the host 100 and the storage device 200. A user of the host 100 and/or the storage device 200 may select the data size of the stripe. The data DATA may include one or more stripes. One stripe may include a plurality of sub-stripe (e.g., C1, C2, C3, . . . , and/or Cn−1). In addition, the stripe may include a parity (e.g., Pc) that is referenced to test errors of the sub-stripes. The sub-stripes and the parity may be distributed and/or stored into a plurality of non-volatile memory devices (e.g., 3011, 3012, 3013, and/or 305). For convenience of description herein, the stripe may consist of a total of N sub-stripes, and/or include L user sub-stripes for storing the user data and/or M parity sub-stripes for storing the parity data (N=M+L).

For example, one sub-stripe data may have the data size corresponding to the read unit of the read operation performed in the non-volatile memory devices 3011, 3012, 3013, and/or 305. The data stored in the non-volatile memory devices 3011, 3012, 3013, and/or 305 may be read in units of read having the same data size as that of the sub-stripe.

When such a RAID configuration is adopted, even if an error occurs in one sub-striped data stored in one storage, the sub-striped data may be recovered by referring to the sub-stripe of the parities Pa, Pb, Pc, and/or Pd. For example, when an error occurs in the C1 sub-stripe data among the sub-stripes C1, C2, C3, . . . and the stripe formed by the parity Pc, the storage controller 210 may recover the C1 sub-stripe data in which an error occurs, using the sub-stripes C2, C3, . . . in which no error occurs and the parity Pc sub-stripe. However, there is a need to use a sub-stripe having no error and/or including a correctable error as a result of performing the error-decoding by the ECC engine 214 for ensuring the data integrity so that the sub-stripe in which an error occurs may be recovered.

In some example embodiments, each of the non-volatile memory devices 3011, 3012, 3013, and/or 305 may be implemented as a single chip and/or die. Further, each chip and/or die may be connected to independently accessible channels by the storage controller 210.

Figure 5:
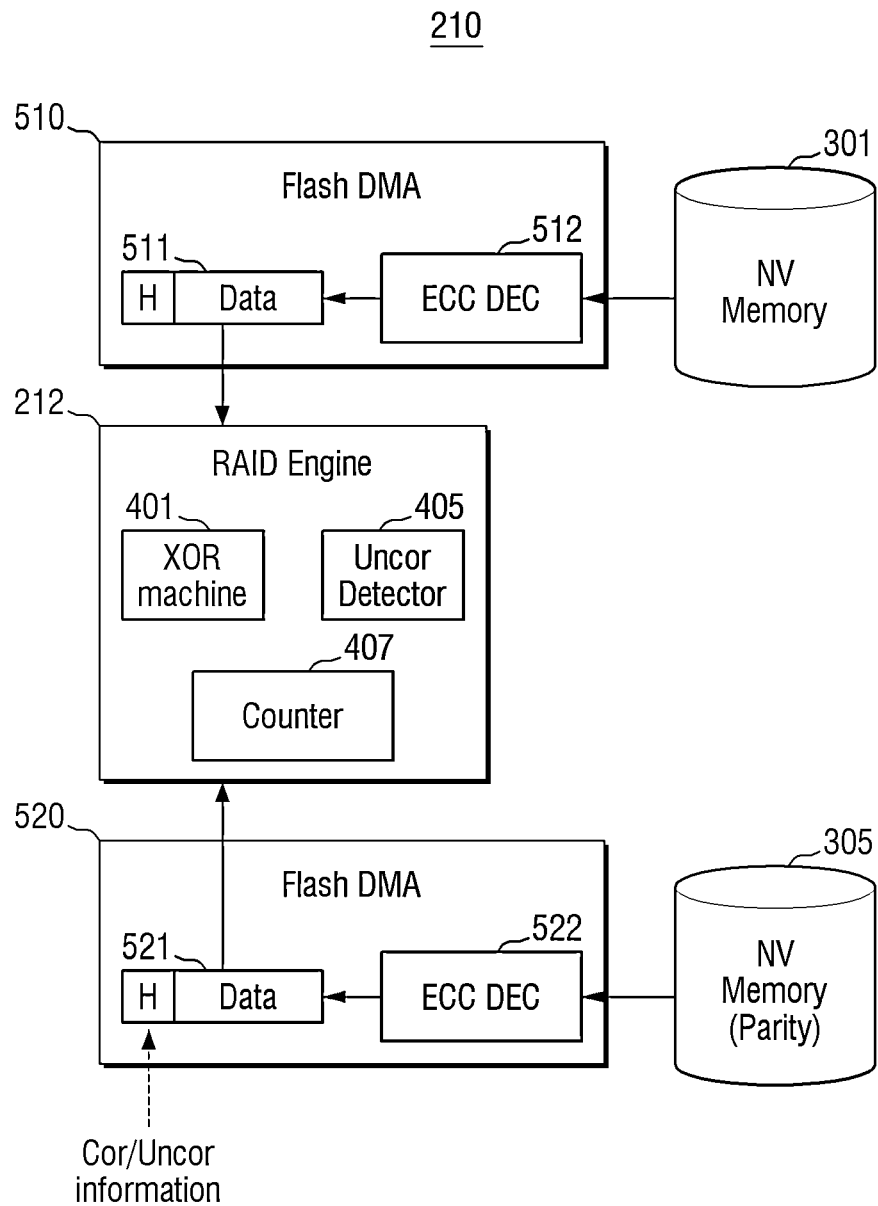
FIGS. 5 and 6 are conceptual diagrams for explaining an operation method of the storage controller according to some example embodiments.
Figure 6:
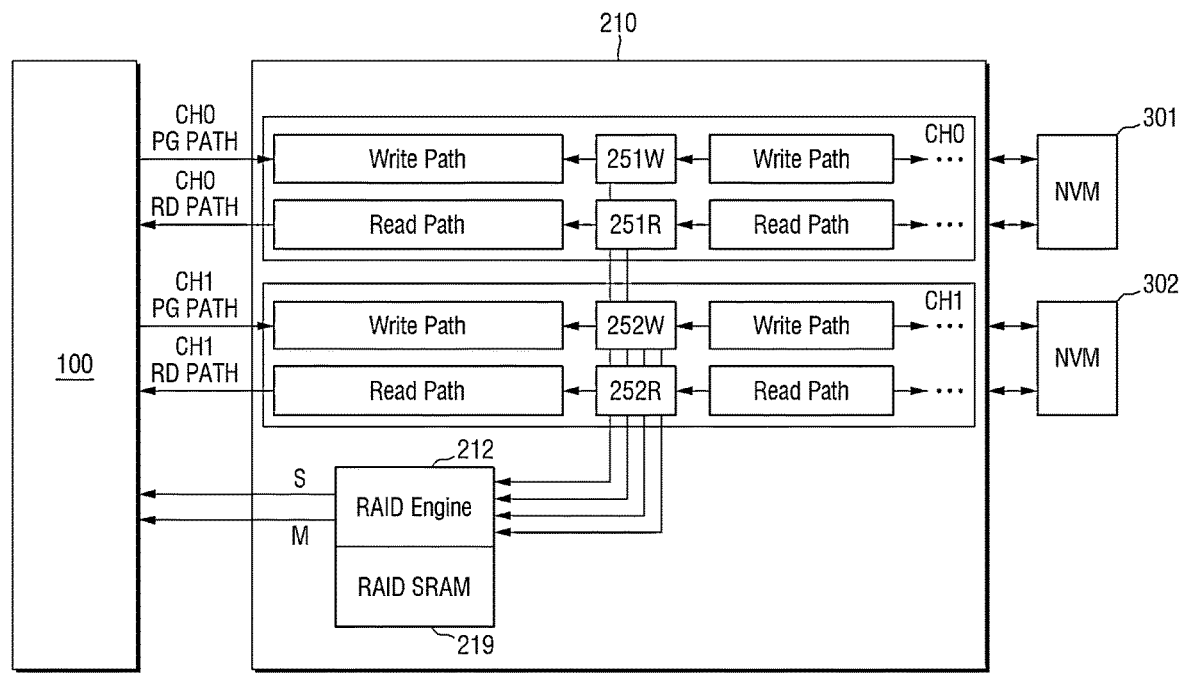

FIGS. 5 and 6 are conceptual diagrams for explaining an operation method of the storage controller according to some example embodiments.

Referring to FIG. 5, the storage controller 210 includes a RAID engine 212, and/or DMA (Direct Memory Access) interfaces 510 and/or 520 according to some example embodiments.

According to some example embodiments, the DMA interfaces 510 and/or 520 may be included in the flash interface 217 of FIG. 2, and the DMA interfaces 510 and/or 520 may be connected to the non-volatile memory devices 301 and/or 305.

When the DMA interfaces 510 and/or 520 receive the sub-stripe data from the non-volatile memory 301, the DMA interfaces 510 and/or 520 may perform the error decoding, attach a header to the decoded data, and/or provide it to the RAID engine 212. Specifically, the ECC engine 214 may include error decoders 512 and/or 522, and/or an error encoder (not shown) according to some example embodiments, and may perform the error decoding and/or the error encoding on the data received and/or transmitted through the DMA interfaces 510 and/or 520. For example, when the ECC engine 214 performs the error decoding on the read sub-stripe data, the DMA interfaces 512 and/or 522 generate a header H including error information based on the decoding result, and may add it to the data (511). Alternatively, when the ECC engine 214 performs the error decoding on the read sub-stripe data as another example, the DMA interfaces 512 and/or 522 may generate basic information including error information based on the decoding result and store it in the register 400, and may associate it with the data (511).

When receiving the header/basic information and/or data 511, the RAID engine 212 checks the header H/basic information and detects whether the data includes an uncorrectable error UCE, and when there is no error or only a correctable error is included, the RAID engine 212 may include it as a target of the XOR calculation. According to some example embodiments, the RAID engine 212 may include an XOR machine 401 and/or an uncorrectable error detector 405.

As an example, the uncorrectable error detector 405 may check the received header and detect whether the data includes the uncorrectable error UCE. If the uncorrectable error UCE is not included, it may be made available to the XOR machine 401. According to some example embodiments, the XOR machine 401 may perform the XOR calculation on the user data, e.g., a plurality of (e.g., M) sub-stripes (e.g., A1, A2, A3, . . . of FIG. 6) to generate at least one (e.g., L) parity sub-stripes. Alternatively, according to some example embodiments, the XOR machine 401 may perform the XOR calculation on L sub-stripe data 511 and/or M parity sub-stripe data 521 based on user data where no uncorrectable error is detected according to the results of the uncorrectable error detector 405 to perform the RAID recovery.

On the other hand, the RAID engine 212 may further include a counter 407. For example, the counter 407 may increase an execution count value i each time the XOR calculation is performed. Alternatively, if the error correction fails as a result of the error decoding, the counter 407 may increase a failure count value k.

The RAID engine 212 may determine whether to determine recovery finished or recovery fail, depending on the count value.

For example, assuming that the data requested by the host are stored as L user data and M parity as total N sub-stripes inside the same stripe of a plurality of non-volatile memory devices. L and M are natural numbers, and L is a number larger than M. The L user data and the M parity may each be data of the sub-stripe unit. Assuming that the first sub-stripe data including one of the L user data or the M parity data includes an uncorrectable error UECC, and the remaining second sub-stripe data except the first sub-stripe data is remaining user data and/or parity data that does not include an uncorrectable error. For example, the first sub-stripe data may be user data or may be parity. For example, the second sub-stripe data may be user data or may be parity.

According to some example embodiments, the RAID engine 212 performs an XOR calculation while increasing the execution count value i for the second sub-stripe data, and performs the XOR calculation until the execution count value i becomes equal to the number N of the entire sub-stripes. When the failure count value k is within the number M of parity sub-stripes, the RAID engine 212 determines that the first sub-stripe data is reliably recovered according to the second sub-stripe data, extracts the XOR calculation result as the first sub-stripe data, and terminates the RAID recovery operation.

The RAID engine 212 performs the XOR calculation on the second sub-stripe data and increases the execution count value i. After that, when the execution count value i reaches the total number N of sub-stripes, but the failure count value k exceeds the number M of parity sub-stripe (k>M), the RAID engine 212 determines that there are many uncorrectable errors UECC and the second sub-stripe data for recovering the first sub-stripe data is insufficient (or lack), and may determine that that the RAID recovery has failed.

However, in this case, the RAID engine 212 may perform enhanced ECC decoding before determining that the RAID recovery has failed. The enhanced ECC decoding may be an operation of performing the error decoding in the soft decision decoding manner in the secondary coding, that is, re-error decoding, if the error coding is primarily performed, for example in the hard decision decoding manner. When an uncorrectable error UCE is determined at the time of primary error decoding but a correctable error CE may be determined at the time of secondary re-error decoding, the ECC engine may correct error of the data to enhance integrity of the second sub-stripe data that participate in the XOR calculation. Further, the aforementioned RAID engine 212 performs the RAID recovery when only one sub-stripe data includes an uncorrectable error inside the RAID, and the RAID engine 212 updates the decoding settings and performs re-error decoding only when two or more sub-stripe data include an uncorrectable error. Thus, it is possible to reduce the number of times of additionally reading the non-volatile memory device for re-error decoding.

According to some example embodiments, the RAID engine 212 performs the XOR calculation on the second sub-stripe data, while increasing the execution count value i. When the second sub-stripe data includes an uncorrectable error, e.g., UECC (uncorrectable by Error Correction Code), the RAID engine 212 increases the failure count value k, and reads the next second sub-stripe data.

When all the sub-stripes N are read, when the failure count value k is smaller than the number M of parity sub-stripes, it is determined that RAID may be recovered with the sub-stripe data read so far, the result of the XOR calculation is extracted as the first sub-stripe data, and the RAID recovery operation is terminated. However, if the failure count value k is larger than the number M of parity sub-stripes, it is determined that data recovery is difficult and the RAID recovery is failed.

Referring to FIG. 6, the storage controller 210 may be connected to a plurality of non-volatile memory devices 301 and/or 302 through a plurality of channels CH0, CH1, . . . , and each of the channels CH0, CH1, . . . may include a write path and/or a read path.

The host 100 may transmit the write requests and/or data to be written through the optical path (PG path), and may transmit the read requests through the read path (RD path) and receive the read data.

According to some example embodiments, the write path of each channel may include write splitters 251W and/or 252W that transmit the data to be written to the RAID engine 212. The read path of each channel may include read splitters 251R and/or 252R that transmit the read data to the RAID engine 212. That is, the write splitters 251W and/or 252W and the read splitters 251R and/or 252R are connected between a front path and a rear path to send data, and may transmit the sent data to the RAID engine 212.

The RAID engine 212 performs the RAID recovery based on the header in which the decoding result of the ECC engine 214 is reflected, and may notify the result of recovery finished or recovery fail to the host 100 (S).

Even if the decoding settings are updated during the RAID recovery process and are reads again, when the sub-stripe data read from at least one non-volatile memory device 300 includes an uncorrectable error, the RAID engine 212 may notify the host 100 of the basic information about the sub-stripe data (for example, address, operating environment information, information related to the error, and/or the like) (M).

According to some example embodiments, when the storage controller 210 receives a sequential read command through an FTL (File Transfer Layer), the storage controller 210 enables all the non-volatile memory devices 300 connected in a RAID manner, and may read the sub-stripe data from each of them.

According to some example embodiments, when the storage controller 210 receives a random read command through the FTL (File Transfer Layer), it is not possible to read all the non-volatile memory devices 300 connected in a RAID manner according to the random read command. Accordingly, the storage controller 210 disconnects the RAID connection, enables all the non-volatile memory devices 300 that belong to the same stripe of the requested data, and may read sub-stripe data from each of them.

In the aforementioned example, because all the sub-stripe data belonging to the same stripe are read, even if at least one first sub-stripe data includes an uncorrectable error UCE, the storage controller 210 may recover the first sub-stripe data in which an error occurs on the basis of the remaining second sub-stripe data read together, and may transmit the entire data based on the recovered first sub-stripe data and the remaining second sub-stripe data to the host 100. Because the storage controller 210 may check whether an uncorrectable error is included on the basis of the error information of each sub-stripe, the RAID engine 212 may make a determination by itself without the intervention of the CPU 211 and perform the RAID recovery.

The RAID engine 212 performs the XOR calculation on the basis of the read sub-stripe data and stores the calculation result. The storage controller 210 may compare the number M of parity sub-stripes with the failure count value to extract the result of the stored XOR calculation as recovered sub-stripe data later. More specific operations will be described in FIGS. 7 and 8 below.

Figure 7:
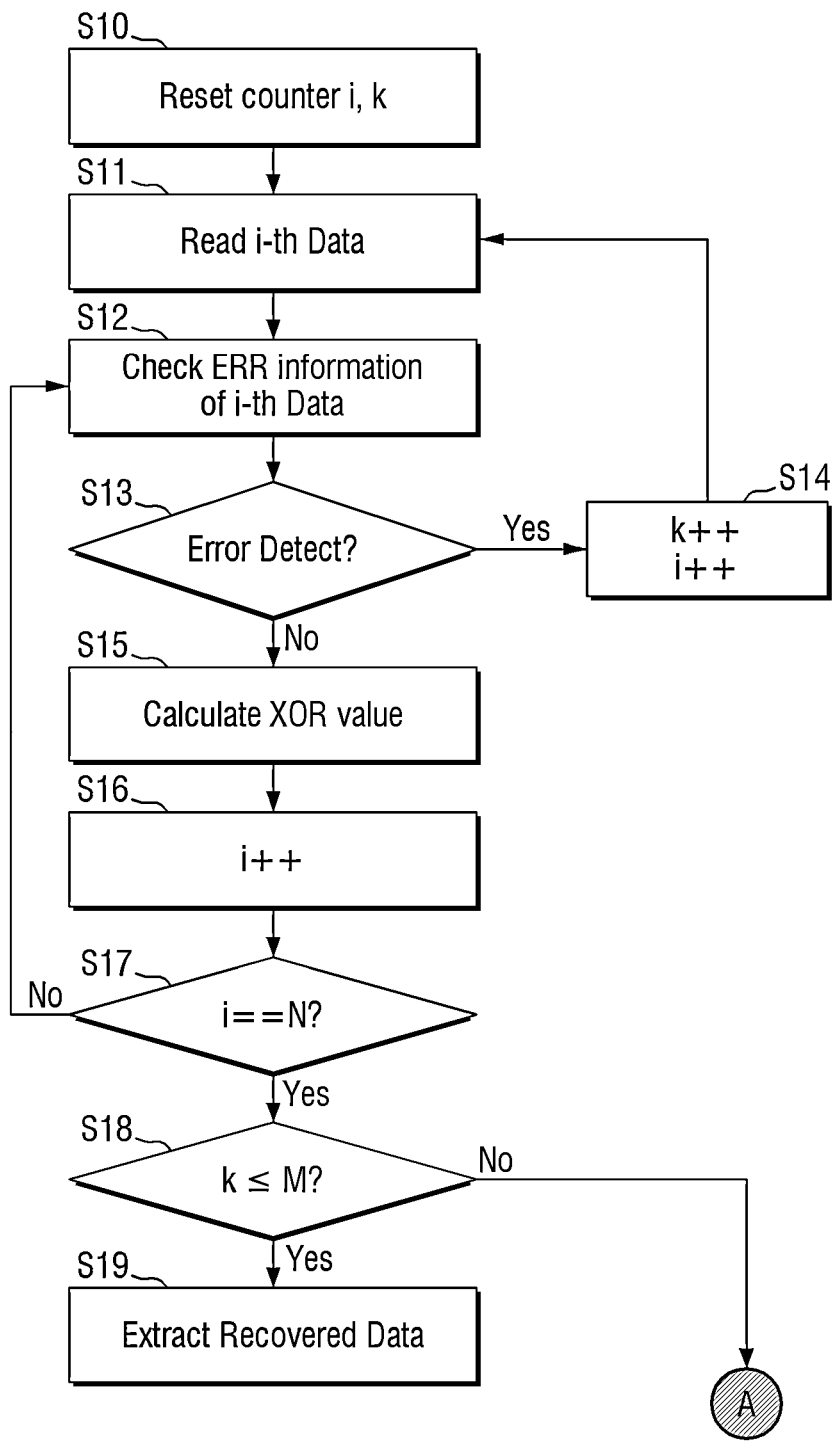
FIG. 7 is a flowchart for explaining an operation method of the storage controller according to some example embodiments.

FIG. 7 is a flowchart for explaining an operation method of the storage controller 210 according to some example embodiments.

Referring to FIG. 7, the storage controller first resets the count value of the counter, for example, the execution count value i and the failure count value k, according to some example embodiments (S10). The storage controller reads the sub-stripe data (i-th Data) from each of the plurality of non-volatile memory devices connected with the RAID (S11), and checks the error information (ERR information) of the read sub-stripe data (S12). The error information may be a header of the read sub-stripe data (i-th Data), or may be based on the basic information stored in the register according to some example embodiments.

The storage controller checks the error information, and if sub-stripe data has an error, that is, if an error is detected (S13), the storage controller increases the failure count value k and the execution count value i (S14), reads the next sub-stripe data (i++ Data) (S11), and repeats steps S12 and S13. On the other hand, the storage controller checks the error information, and if the sub-stripe data has no error (S13), the storage controller performs the XOR calculation using the read sub-stripe data (i-th Data) (S15), and increases the execution count value i (S16).

The storage controller repeats steps S12 to S17 (S17) until the increased execution count value i becomes equal to the total number N of sub-stripes. If the increased execution count value i becomes equal to the total number N of sub-stripe (e.g., the total number of data sub-stripes and parity sub-stripes) (S17), that is, all the sub-stripes of the non-volatile memory device are read, the storage controller compares the failure count value k with the predetermined (or alternately given) value M (S18). At this time, the predetermined (or alternately given) value M may be the number of parity sub-stripes in the plurality of non-volatile memory devices connected with the RAID. For example, M may be 1 in the case of RAID5, and M may be 2 in the case of RAID6.

If the failure count value k is equal to or smaller than the predetermined (or alternately given) value M (S18), the storage controller determines that it may be recovered in the RAID manner, and extracts the value subjected to the XOR calculation in step S15 as recovery data (S19). On the other hand, when the failure count value k is greater than the predetermined (or alternately given) value M (S18), the storage controller may make a determination according to FIG. 8.

Figure 8:
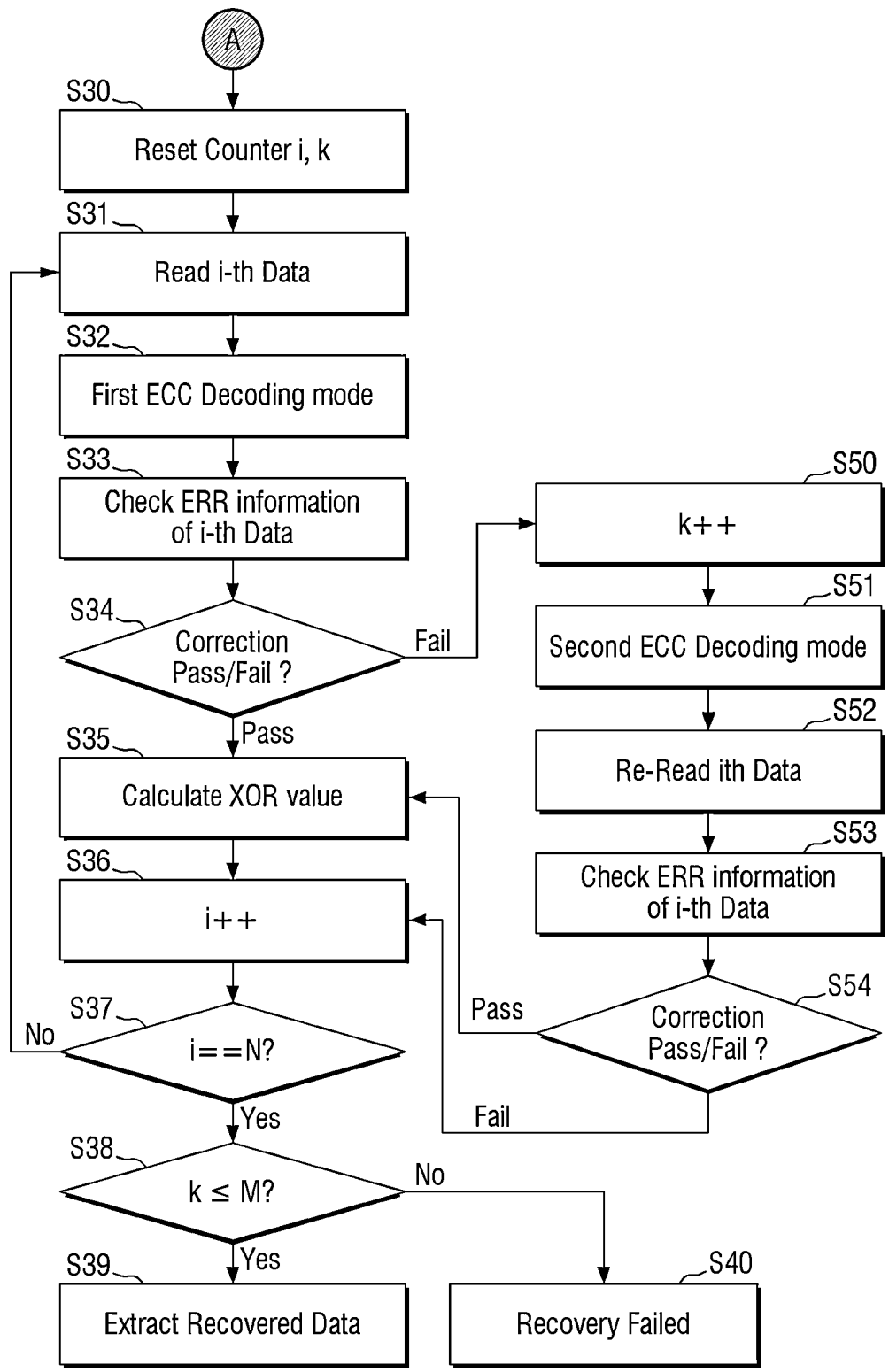
FIG. 8 is a flowchart for explaining the operation method of the storage controller according to some example embodiments.

FIG. 8 is a flowchart for explaining the operation method of the storage controller according to some example embodiments.

Referring to FIGS. 7 and 8, when the failure count value k is greater than the predetermined (or alternately given) value, the storage controller performs steps S30 to S54 which primarily read the sub-stripe data again, attempt to perform the error decoding, and check again whether an error cannot be recovered.

Specifically, the storage controller resets the count value again (S30), and reads the sub-stripe data from a plurality of non-volatile memories connected with the RAID (S31).

The read sub-stripe data (i-th Data) is set to a first error decoding mode (S32), and the error decoding is performed in the set mode (S33).

If the error is a correctable error as a result of the first error decoding (S34, Pass), the XOR calculation is performed using the sub-stripe data (i-th Data) (S35), and the execution count value i is increased to read the next sub-stripe data (S36). Steps S31 to S36 are repeated until the execution count value i becomes equal to the total number N of sub-stripes (S37). When the execution count value i becomes equal to the total number of sub-stripes (S37), that is, when all the sub-stripes are read, the failure count value k is compared with the predetermined (or alternately given) value M. The predetermined (or alternately given) value M is the number of parity sub-stripes, as described in FIG. 7.

If the failure count value k is within the predetermined (or alternately given) value (S38, Yes), it is determined as a case that can be recovered using the parity sub-stripe data, and the XOR calculation result of S35 is extracted as recovery data (S39). If the failure count value k exceeds the predetermined (or alternately given) value (S38, No), it is determined as case that cannot be recovered, the recovery failure is determined, and the recovery operation is terminated (S40).

If an error is an uncorrectable error as a result of the first error decoding (S34, Fail), the failure count value k is increased (S50), the setting is changed to second error decoding (S51), the sub-stripe data that has been read at S31 is read again (S52), and the error decoding is performed in the set mode (S53). For example, the first error decoding may perform the error decoding in a hard decision decoding manner, and/or the second error decoding may perform the error decoding in a software decision decoding manner. Although an uncorrectable error UCE is determined at the time of the first error decoding, if a correctable error CE may be determined at the time of the second error decoding, the storage controller may correct an error of data to enhance the integrity of the second sub-stripe data that participates in the XOR calculation.

If the error is a correctable error as a result of the second error decoding (S54, Pass), steps after S35 are performed, and if the error is an uncorrectable error (S54, Fail), steps after S36 are performed. That is, in the case of uncorrectable error, the next sub-stripe data is read without further performing the error decoding.

Accordingly, according to some example embodiments, a RAID recovery operation may be successfully performed even in a case where a number of sub-stripes including uncorrectable errors exceeds a number of parity sub-stripes. Further, fewer resources may be used for the recovery operation. Further still, an amount of time for performing the recovery operation may be reduced by using less resources.

Figure 9:
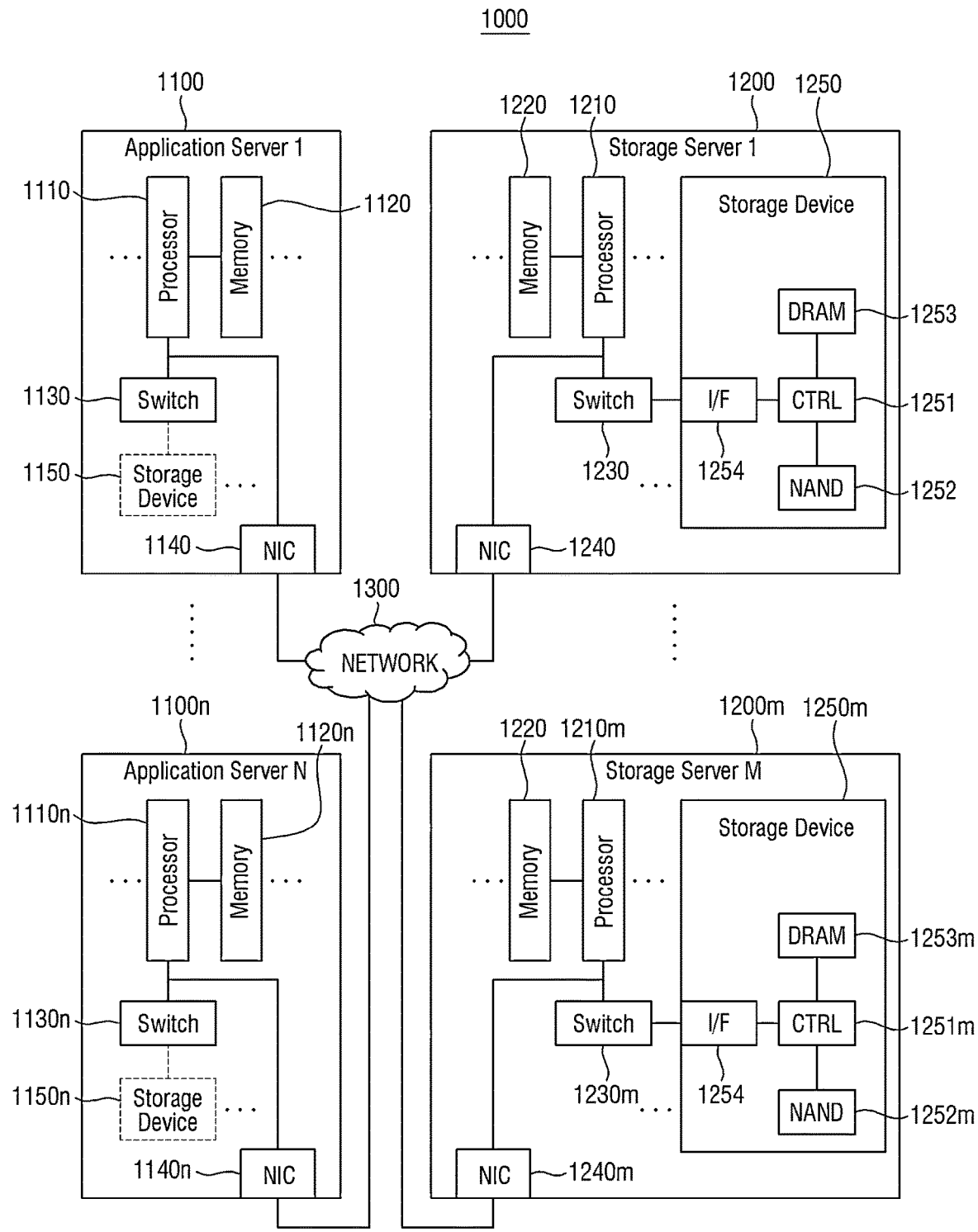
FIG. 9 is a diagram showing a data center to which the storage devices according to some example embodiments are applied.

FIG. 9 is a diagram showing a data center to which the storage devices according to some example embodiments are applied.

Referring to FIG. 9, a data center 1000 is a facility that gathers various types of data and provides services, and may be called a data storage center. The data center 1000 may be a search engine and/or a system for database operation and/or may be a computing system used by corporations such as banks and/or government agencies. The data center 1000 may include application servers 1100 to 1100n and storage servers 1200 to 1200m. The number of application servers 1100 to 1100n and the number of storage servers 1200 to 1200m may be variously selected depending on the example embodiments, and the number of application servers 1100 to 1100n and the number of storage servers 1200 to 1200m may be different from each other.

The application server 1100 and/or the storage server 1200 may include at least one of the processors 1110 and 1210 and the memories 1120 and 1220. Taking the storage server 1200 as an example, the processor 1210 may control the overall operation of the storage server 1200, and access the memory 1220 to execute command language and/or data loaded into the memory 1220. The memory 1220 may be a DDR SDRAM (Double Data Rate Synchronous DRAM), a HBM (High Bandwidth Memory), a HMC (Hybrid Memory Cube), a DIMM (Dual In-line Memory Module), an Optane DIMM and/or a NVMDIMM (Non-Volatile DIMM).

Depending on the example embodiments, the number of processors 1210 and/or the number of memories 1220 included in the storage server 1200 may be variously selected. In some example embodiments, the processor 1210 and the memory 1220 may provide a processor-memory pair. In some example embodiments, the number of processors 1210 and the number of memories 1220 may be different from each other. The processor 1210 may include a single core processor or a multi-core processor. The aforementioned explanation of the storage server 1200 may also be similarly applied to the application server 1100. Depending on the example embodiments, the application server 1100 may not include a storage device 1150. The storage server 1200 may include at least one or more storage devices 1250. The number of storage devices 1250 included in the storage server 1200 may be variously selected depending on the example embodiments. Depending on the example embodiments, when the storage devices 1250 are non-volatile memories, they may also be implemented as the storage devices in FIG. 1-8.

The application servers 1100 to 1100*n* and the storage servers 1200 to 1200*m* may communicate with each other through a network 1300. The network 1300 may be implemented, using a FC (Fibre Channel), an Ethernet, and/or the like. At this time, FC is a medium used for a relatively high-speed data transfer, and may use an optical switch that provides high performance/high availability. The storage servers 1200 to 1200*m* may be provided as a file storage, a block storage and/or an object storage, depending on the access type of the network 1300.

In an example, the network 1300 may be a storage-only network such as a SAN (Storage region Network). For example, a SAN may be an FC-SAN which uses an FC network and is implemented according to FCP (FC Protocol). In another example embodiment, a SAN may be an IP-SAN which uses a TCP/IP network and is implemented according to an iSCSI (SCSI over TCP/IP or Internet SCSI) protocol. In another example embodiment, the network 1300 may be a general network such as a TCP/IP network. For example, the network 1300 may be implemented, according to protocols such as an FCoE (FC over Ethernet), a NAS (Network Attached Storage), and/or an NVMe-oF (NVMe over Fabrics).

Hereinafter, the application server 1100 and the storage server 1200 will be mainly described. The explanation of the application server 1100 may also be applied to another application server 1100*n*, and the explanation of the storage server 1200 may also be applied to another storage server 1200*m*.

The application server 1100 may store the data requested to store by a user or client in one of the storage servers 1200 to 1200*m* through the network 1300. Further, the application server 1100 may acquire the data requested to read by the user or client from one of the storage servers 1200 to 1200*m* through the network 1300. For example, the application server 1100 may be implemented by a Web server and/or a DBMS (Database Management System).

The application server 1100 may access the memory 1120*n* and/or the storage device 1150*n* included in another application server 1100*n* through the network 1300, or may access the memories 1220 to 1220*m* and/or the storage devices 1250 to 1250*m* included in the storage servers 1200 to 1200*m* through the network 1300. Accordingly, the application server 1100 may perform various operations on the data stored in the application servers 1100 to 1100*n* and/or the storage servers 1200 to 1200*m*. For example, the application server 1100 may execute commands for moving and/or copying the data between the application servers 1100 to 1100*n* and/or the storage servers 1200 to 1200*m*. At this time, the data may be moved from the storage devices 1250 to 1250*m* of the storage servers 1200 to 1200*m* via the memories 1220 to 1220*m* of the storage servers 1200 to 1200*m*, or may be directly moved to the memories 1120 to 1120*n* of the application servers 1100 to 1100*n*. Data which moves through the network 1300 may be data encrypted for security and privacy.

Taking the storage server 1200 as an example, an interface 1254 may provide a physical connection between the processor 1210 and a controller 1251, and/or a physical connection between the NIC 1240 and the controller 1251. For example, the interface 1254 may be implemented by a DAS (Direct Attached Storage) type in which the storage device 1250 is directly connected with a dedicated cable. Further, for example, the interface 1254 may be implemented by various interface types, such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), an SD (secure digital) card, a MMC (multi-media card), an eMMC (embedded multi-media card), a UFS (Universal Flash Storage), an eUFS (embedded Universal Flash Storage), and/or a CF (compact flash) card interface.

The storage server 1200 may further include a switch 1230 and/or a NIC 1240. The switch 1230 may selectively connect the processor 1210 and the storage device 1250 or may selectively connect the NIC 1240 and the storage device 1250, according to the control of the processor 1210.

In some example embodiments, the NIC 1240 may include a network interface card, a network adapter, and/or the like. The NIC 1240 may be connected to the network 1300 by a wired interface, a wireless interface, a Bluetooth interface, an optical interface, and/or the like. The NIC 1240 may include an internal memory, a DSP, a host bus interface, and/or the like, and may be connected to the processor 1210, and/or the switch 1230, and/or the like through the host bus interface. The host bus interface may also be implemented as one of the examples of the interface 1254 described above. In some example embodiments, the NIC 1240 may also be integrated with at least one of the processor 1210, the switch 1230, and the storage device 1250.

In the storage servers 1200 to 1200*m* or the application servers 1100 to 1100*n*, the processors 1110 and 1210 may transmit the commands to the storage devices 1130 to 1130*n* and 1250 to 1250*m* or the memories 1120 to 1120*n* and 1220 to 1220*m* to program and/or read the data. At this time, the data may be data in which an error is corrected through an ECC (Error Correction Code) engine. The data is data subjected to data bus inversion (DBI) and/or data masking (DM) process, and may include CRC (Cyclic Redundancy Code) information. The data may be data that is encrypted for security and privacy.

The storage devices 1150 to 1150*m* and/or 1250 to 1250*m* may transmit the control signal and/or command/address signal to the NAND flash memory devices 1252 to 1252*m* in response to the read command received from the processor. Accordingly, when data is read from the NAND flash memory devices 1252 to 1252*m*, the RE (Read Enable) signal is input as a data output control signal, and may serve to output the data to the DQ bus. A DQS (Data Strobe) may be generated, using the RE signal. Command and/or address signals may be latched to the page buffer, depending on a rising edge and/or a falling edge of a WE (Write Enable) signal.

The controller 1251 may generally control the operation of the storage device 1250. In some example embodiments, the controller 1251 may include a SRAM (Static Random Access Memory). The controller 1251 may write data in the NAND flash 1252 in response to a write command, and/or may read the data from the NAND flash 1252 in response to a read command. For example, the write command and/or the read command may be provided from the processor 1210 in the storage server 1200, the processor 1210*m* in another storage server 1200*m*, and/or the processors 1110 and/or 1110*n* in the application servers 1100 and 1100*n*. A DRAM 1253 may temporarily store (buffer) the data to be written in the NAND flash 1252 and/or the data read from the NAND flash 1252. Also, the DRAM 1253 may store meta data. Here, the meta data is a user data and/or data generated by the controller 1251 to manage the NAND flash 1252. The storage device 1250 may include an SE (Secure Element) for security and/or privacy.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those skilled in the art will appreciate that many variations and modifications may be made to the example embodiments without substantially departing from the principles of the present inventive concepts. Therefore, the disclosed example embodiments of the inventive concepts are used in a generic and descriptive sense only and not for purposes of limitation.

What is claimed is:

1. A storage controller comprising:
   processing circuitry configured to
     read sub-stripe data from each of a plurality of non-volatile memory devices connected with a Redundant Array of Inexpensive Disk (RAID),
     check error information of at least one of the sub-stripe data,
     store error information as a header or basic information of the sub-stripe data,
     store an execution count value,
     increase the execution count value each time the sub-stripe data is read,
     store a failure count value,
     increase the failure count value in response to the sub-stripe data having an uncorrectable error, and
     perform a RAID recovery operation in response to the error information indicating the at least one of the sub-stripe data has the uncorrectable error, and
   a RAID memory configured to store calculation results of the RAID recovery operation.

2. The storage controller of claim 1, wherein the processing circuitry is further configured to:
   read the sub-stripe data; and
   execute the RAID recovery operation on the basis of the error information, until the execution count value becomes equal to a total number of sub-stripes.

3. The storage controller of claim 1, wherein the processing circuitry is further configured to perform the RAID recovery operation by
   performing an XOR calculation on all the sub-stripe data in which no error is detected, and storing an XOR calculation result in the RAID memory, and extracting the stored XOR calculation result as recovered data, in response to the failure count value being less than a number of parity sub-stripes.

4. The storage controller of claim 1, wherein the processing circuitry is further configure to:
   perform error-decoding of the sub-stripe data on the basis of the error information; and
   perform error-decoding of the sub-stripe data, in response to the failure count value exceeding a number of parity sub-stripes.

5. The storage controller of claim 4, wherein the processing circuitry is further configured to:
   perform a primary error decoding on the sub-stripe data by hard decision error decoding; and
   perform a secondary error decoding by soft decision error decoding, in response to an error of the sub-stripe data not being corrected by the primary error decoding.

6. The storage controller of claim 5, wherein the processing circuitry is further configured to terminate the RAID recovery operation, in response to the error of the sub-stripe data not being corrected by the secondary error decoding.

7. An operation method of a storage controller, the operation method comprising:
   reading sub-stripe data from each of a plurality of non-volatile memory devices connected with a Redundant Array of Inexpensive Disk (RAID);
   checking error information of the read sub-stripe data to check an existence of an uncorrectable error;
   increasing a failure count value and reading next sub-stripe data, in response to the error information indicating the read sub-stripe data has an error; and
   performing an XOR calculation by the read sub-stripe data in response to the read sub-stripe data not having the error,
   resetting the failure count value and re-reading the sub-stripe data stored in each of the plurality of non-volatile memory devices, in response to the failure count value exceeding a number of parity sub-stripes,
   wherein the error information is stored as a header or basic information of the sub-stripe data.

8. The operation method of the storage controller of claim 7, further comprising:
   extracting an XOR calculation result as recovery data, in response to the failure count value being within a number of parity sub-stripes once the storage controller reads all the sub-stripe data.

9. The operation method of the storage controller of claim 7, further comprising:
   performing a first error decoding on the re-read sub-stripe data, and
   extracting an XOR calculation result as recovery data in response to the error being corrected and the failure count value being less than the number of the parity sub-stripes once all the sub-stripe data are read.

10. The operation method of the storage controller of claim 9, further comprising:
    reading the sub-stripe data by a second error coding, stronger than the first error decoding, in response to the error not being corrected on the re-read sub-stripe data.

11. The operation method of the storage controller of claim 10, further comprising:
    increasing the failure count value in response to the error not being corrected by the first error coding.

12. The operation method of the storage controller of claim 10, further comprising:
    performing an XOR calculation with the re-read sub-stripe data in response to the error being corrected on the re-read sub-stripe data by the second error coding.

13. The operation method of the storage controller of claim 12, further comprising:

reading a next sub-stripe data in response to the error not being corrected by the second error coding.

14. The operation method of the storage controller of claim 13, further comprising:
terminating a RAID recovery operation in response to the failure count value exceeding the number of parity sub-stripes.

15. A storage controller comprising:
a Direct Memory Access (DMA) interface connected to a plurality of non-volatile memory devices, the DMA interface configured to transmit and receive sub-stripe data to and from each of the non-volatile memory devices; and
processing circuitry configured to
check error information of the sub-stripe data, the error information being stored as a header or basic information of the sub-stripe data, and
perform an XOR calculation on the basis of the error information indicating the sub-stripe data has no uncorrectable error to extract recovery data,
wherein the processing circuitry is configured to re-read the sub-stripe data having the uncorrectable error and perform first error decoding, and performs the XOR calculation on the basis of the sub-stripe data to extract recovery data in response to the uncorrectable error being corrected, and
wherein the processing circuitry is configured to extract the recovery data in response to the error information indicating a number of the sub-stripe data has the uncorrectable error and the number of the sub-stripe data having the uncorrectable error being less than or equal to a number of parity sub-stripes.

16. The storage controller of claim 15, wherein, in response to the uncorrectable error not being corrected by the first error decoding, the processing circuitry is further configured to:
read the sub-stripe data; and
perform a second error decoding that is stronger than the first error decoding.

* * * * *